United States Patent [19]

Dema et al.

[11] 3,726,234
[45] Apr. 10, 1973

[54] TWO-RAIL CONVEYOR WITH A DEVICE FOR DRAWING, ENGAGING AND DISENGAGING THE LOAD-BEARING TROLLEY

[76] Inventors: Andrea Dema; Aldo Pulcini; Ernesto Rossotti, all of Via Villadeati 4 (main office), Turin, Italy

[22] Filed: Jan. 26, 1971

[21] Appl. No.: 109,814

[30] Foreign Application Priority Data

Aug. 4, 1970 Italy..............................69674 A/70

[52] U.S. Cl................................................104/172 S
[51] Int. Cl...............................................B65g 17/42
[58] Field of Search............................104/172 S, 96

[56] References Cited

UNITED STATES PATENTS

| | | | |
|---|---|---|---|
| 3,196,805 | 7/1965 | Bishop et al. | 104/172 S |
| 3,314,377 | 4/1967 | Dehne | 104/172 S |
| 3,472,177 | 10/1969 | Di Rosa | 104/172 S |
| 3,559,585 | 2/1971 | Lempio | 104/172 S |
| 3,618,532 | 11/1971 | Clewett | 104/172 S |

FOREIGN PATENTS OR APPLICATIONS 1,370,208   7/1964   France..............................104/172 S

*Primary Examiner*—Robert G. Sheridan
*Assistant Examiner*—Robert Saifer
*Attorney*—Michael S. Striker

[57] ABSTRACT

An overhead conveyor comprising a drive being guided for movement in longitudinal direction in an upper track and having a plurality of downwardly projecting driving members spaced in longitudinal direction of the chain from each other, and a plurality of trolley means guided for movement in said direction on a lower guide track extending spaced from and substantially parallel to the upper guide track. Each of the trolley means has a lever pivotable about a horizontal pivot axis and being provided with an upwardly extending tooth located forwardly of the pivot axis and held by biasing means in the path of movement of a respective driving member to be engaged by the latter. The engaging faces of driving member and tooth being inclined in such a manner that the line of thrust imparted by the driving member to the tooth passes below the pivot axis to keep said faces in engagement with each other. The lever has on a portion projecting forwardly beyond said tooth an upper inclined cam face adapted to cooperate with a rearwardly projecting spur of a preceding trolley to disengage the faces on the tooth and the corresponding drive member from each other during movement of two adjacent trolley means toward each other.

8 Claims, 6 Drawing Figures

TWO-RAIL CONVEYOR WITH A DEVICE FOR DRAWING, ENGAGING AND DISENGAGING THE LOAD-BEARING TROLLEY

The conveyor according to the present invention has two rails or tracks placed one above the other and suitably separated by means of suitably connected support brackets. A first upper rail is used to support and guide in a slidable manner a drive chain continuously moved in longitudinal direction by means of known devices, and a second lower rail is used to support and guide in a slidable manner the double-bodied trolleys, the same being connected with the aid of jointed couplings by means of a link bar to support the loads. According to the invention, the drive chain has a plurality of driving members spaced in longitudinal direction of the chain from each other and projecting, downwardly and each presenting an inclined front face.

The front trolley is equipped, on its top surface, with a lever tiltable about a horizontal pin mounted on two bearings projecting upwards from the trolley, the lever having forwardly of the pin an upwardly projecting tooth having an inclined rear face which is brought in engagement with said front face of the driving member by means of a counterweight forming an integral part of the other end of the lever, or by some other equivalent means.

The tooth on the lever has an inclined rear face contrasting with the inclined front face of the driving member, the two pieces being dimensioned and mounted in such a way that the two surfaces faces in contact have a slope whose thrust resultant passes below the pivot axis of the lever, giving rise to an upward thrust to the tooth and thus assuring a firm engagement of the two faces. The lever has an elongated portion whose upper part has an inclined cam face acted on by a spur protruding from the rear trolley of another pair of trolleys.

When the trolleys approach each other, the spur comes into contact with the inclined cam face, so that the tooth is disengaged from the driving member and the trolley is no longer driven.

A second or holding lever is mounted in a rocking manner on the same pin. The holding lever has at one end a front face normally spaced from a rear face of a respective driving member and held in the path of movement of the latter by means of a counterweight applied to its other end, or by some other equivalent means so as to keep the trolley engaged with a driving member on the chain whenever such trolley must move at a greater speed than the chain.

The rear trolley has an integral rearwardly and projecting spur to disengage the tooth and lever from the driving member on the chain.

Both the front and the rear trolley have each a pair of bearing wheels mounted on horizontal shafts, and two guide wheels mounted on vertical axles.

The two bearing wheels run on rails and the two guide wheels run between the rails.

According to another embodiment of the invention, the trolley on which the loads are suspended is a single body. In this case, the spur projects from the rear of the single body. The size of the load being carried must be proportioned to the length of the trolley.

The traction chain can be chosen from those of known type, provided it is capable of mounting the driving members.

Other details and advantages of the invention will appear from the attached drawings and the following description, all of which are offered by way of example only.

Figure 1:
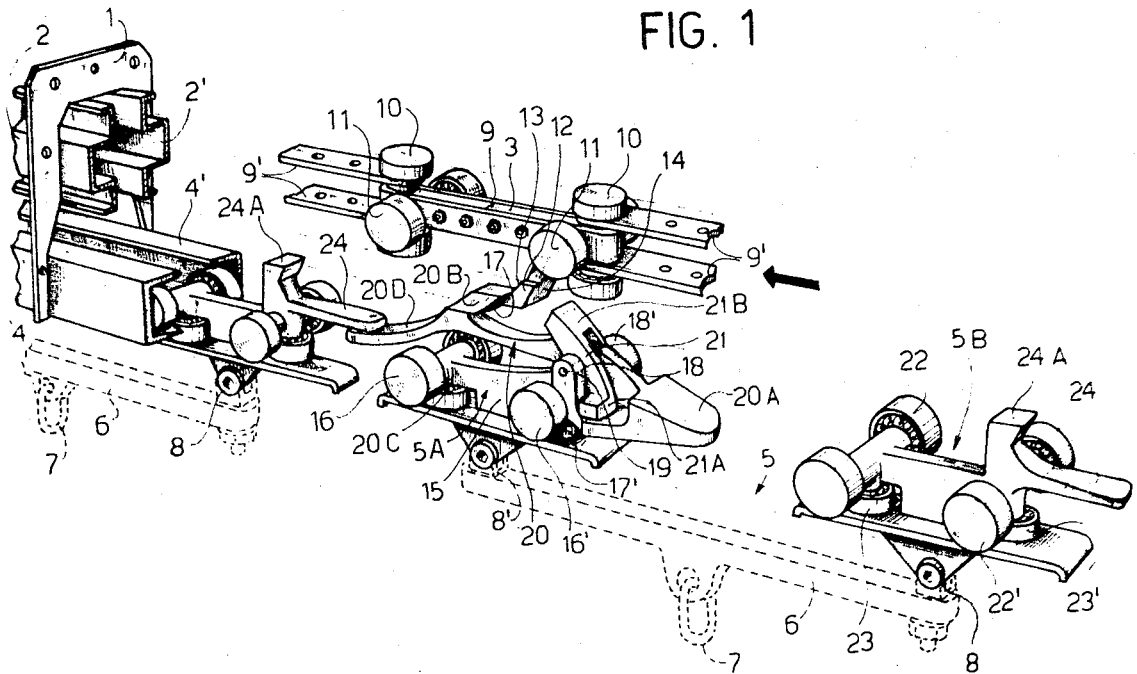
FIG. 1 shows, in perspective and in partial section, a view of a two-rail overhead conveyor with a link-type drive chain with vertical and horizontal couplings, equipped with an inclined-surface traction hook or driving member, and a double load-bearing trolley at the commencement of unhooking by means of the action of the spur of the rear trolley of a pair of trolleys.
Figure 2:
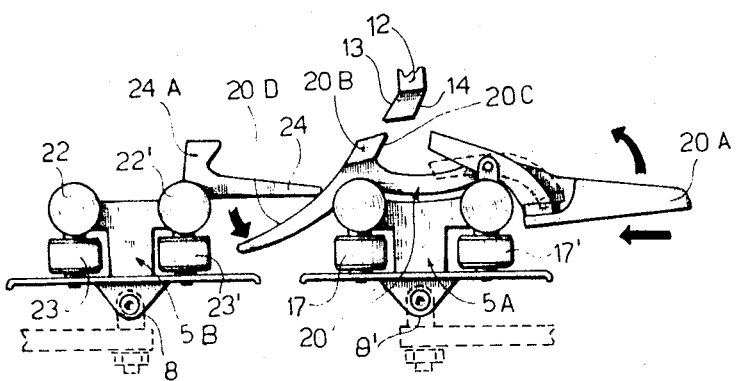
FIG. 2 is a side view of the rear trolley of a pair of trolleys with the spur in contact with the lever of the front trolley of another pair at the start of the disengagement of the tooth on the lever from the driving member.

With reference to the drawings: 1 indicates the coupling and support bracket for two pairs of rails, 2 and 2' indicate the pair of rails for the drive chain formed of elements 3, while 4 and 4' show the pair of rails for the pair of load-bearing trolleys 5, each consisting of a front trolley 5A and a rear trolley 5B connected by a coupling bar 6 with a load-supporting ring 7, the bar being connected to the two trolleys by means of the two spherical or cardanic joints 8 and 8'.

Element 3 of the drive chain has a body on which are mounted two pairs of wheels 10 and 11 with orthogonal axles connected to another body with a pair of plates lying in the vertical plane 9 or in the horizontal plane 9'. Between the plates 9 lying in the vertical plane the traction hook or driving member 12 with two inclined faces is mounted protruding from the lower part, one front 13 and one rear 14 face being employed for the traction and the retention of the front trolley 5A respectively.

The front trolley 5A has a frame 15 at the ends of which are mounted two pairs of bearing wheels 16 and 16' respectively with horizontal axles and two guide wheels 17 and 17' with a vertical axle.

Above, two bearing 18 and 18' support a pivot pin 19 on which two levers are mounted, namely the traction lever 20 and the retaining or holding lever 21.

Both levers have a counterweight 20A respectively 21A at one end. These counteweights keep the tooth 20B of the lever 20 and front portion 21B of the holding lever raised so that they can engage and disengage themselves during the shifting and the arrest of the trolleys.

The tooth 20B has an inclined rear face 20C for contact with the corresponding inclined front face 13 of the hook or driving member 12, their inclination being such that the thrust resultant passes below the the axis of the pivot pin 19.

Lever 20 has an extended portion forming an inclined cam face 20D at the end opposite to that of the counterweight 20A.

The tooth 20B of the lever 20 and front face of the lever 21 are set apart in such a way as to permit the insertion of the traction hook 12 between them.

The rear trolley 5B has two pairs of bearing wheels 22-22' with horizontal axles and two guide wheels 23-23' with a vertical axle.

Projecting rearwardly from the rear trolley frame 5B and forming an integral part with the same is a spur 24 to actuate lever 20 of the leading trolley 5 by acting on the portion 20D, an inclined surface, so as to cause the release of trolley 5A from the traction hook 12 when the pair of trolleys 5 makes contact.

A tooth 24A projects upwards from trolley 5B at a level below that of the traction hook 12.

Figure 3:
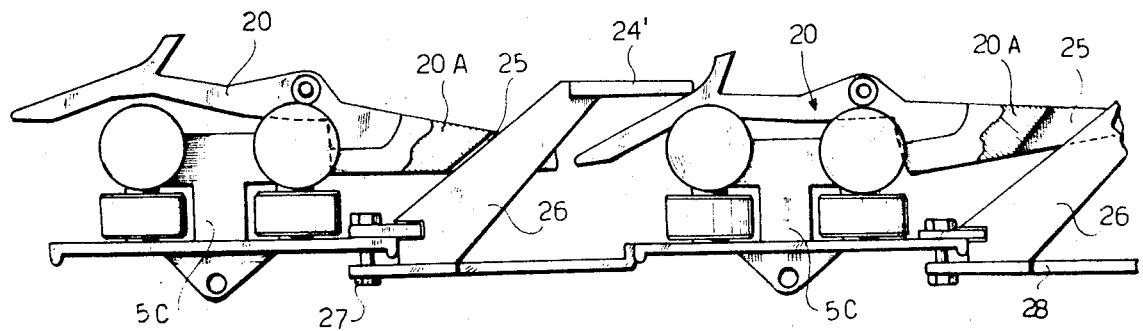
FIG. 3 shows a lateral view of two single trolleys equipped with a spacer plate, and the rear spur used for the unhooking of the next trolley (the holding lever has been omitted from this figure).
Figure 4:
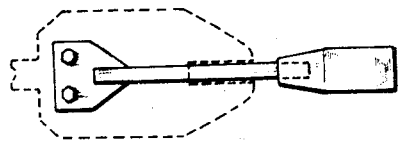
FIG. 4 is a plan view of the unhooking spur shown in FIG. 3.

With reference to FIGS. 3 & 4: 5C indicates a single load-bearing trolley, in which the lever 20 has a counterweight 20A with a slot 25 in its tail. An arm 26 is fixed at one end to the frame 5C of the trolley by means of bolts. This arm passes through the slot 25 and its upper end has a horizontally directed spur 24', whose attitude corresponds with that of spur 24 of trolley 5B. The character 28 indicates a spacer plate that forms one piece with the arm 26 and the frame 5C.

Figure 5:
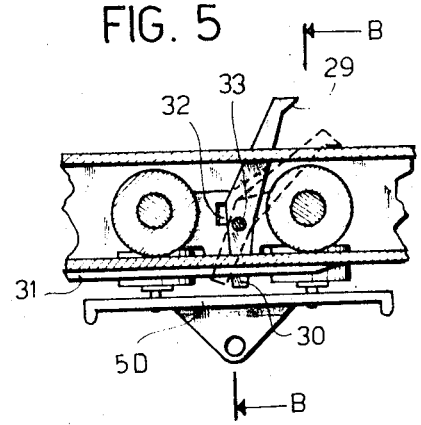
FIG. 5 shows a portion of a rail with a rear trolley equipped with a rocking lever actuated during the operating stage by means of a cam applied on the lower face of the trolley-bearing rail, the whole as a section along the line A—A of FIG. 6.
Figure 6:
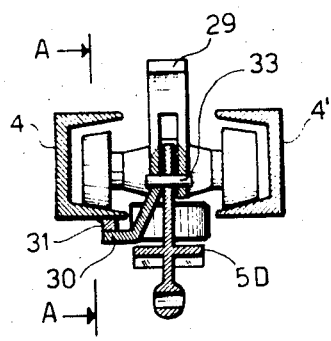
FIG. 6 is a view in lateral section along the line B—B of FIG. 5.
Figure 2A:
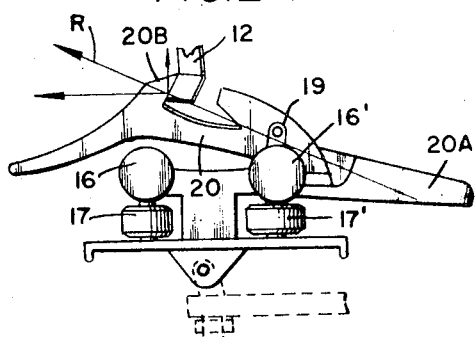

With reference to FIGS. 5 & 6: 33 indicates a transverse pivot pin mounted on trolley 5D on which a ratchet tooth 29 is applied in a rockable manner. The ratchet tooth 29 has inclined surfaces corresponding to surface 13 of the hook 12 and a pawl 30 engaged by a cam 31 forming an integral part of rail 4. The character 32 shows the striker surface and end of travel of the ratchet tooth 29. This ratchet tooth is held in substantially vertical position by its own weight.

It will be obvious that various modifications may be made to the conveyor here described and illustrated. For example, the drive chain and its rail may be replaced by other similar types, e.g. the rail may be in the form of a double T and two wheels of the drive chain may be mounted on a yoke and hung from the lower flanges of the rail.

What we claim is:

1. An overhead conveyor comprising an upper and a lower track held in spaced superimposed substantially parallel relationship; drive chain means guided in said upper track for movement in longitudinal direction and having a plurality of downwardly extending driving members spaced in longitudinal direction of said chain from each other, each of said driving members having a downwardly and forwardly inclined front face; a plurality of load bearing trolley means guided on said lower track for movement in said direction; a lever mounted on each trolley means tiltable about a pivot axis extending substantially normal to the direction of movement of said trolley means and each having an upwardly projecting tooth having an upwardly and rearwardly inclined rear face; biasing means connected to said lever for tilting the same in a direction for holding said rear face of said tooth in the path of movement of the front face of a corresponding driving member so that said faces engage each other, the inclination of said faces being such that in the engaged position thereof the line of the resultant of the thrust imparted by the driving member on to said tooth will pass below said pivot axis of said lever to thus assure continued engagement of said faces.

2. A conveyor as set forth in claim 1, wherein said biasing means comprises a weight integral with said lever.

3. A conveyor as set forth in claim 1, wherein each lever has a front portion projecting forwardly around said tooth thereon and having an upper rearwardly and upwardly inclined cam face, and wherein each of said trolley means has a rearwardly projecting spur adapted to engage a cam face on a following trolley means during movement of two adjacent trolley means toward each other to thereby tilt the lever of the following trolley in a direction to move said rear face of said tooth away from said front face of said driving member to thus disengage said faces from each other.

4. A conveyor as set forth in claim 3, wherein each of said trolley means comprises a front trolley and a rear trolley connected to each other by a coupling bar, said lever being pivotally mounted on said front trolley and said spur being integral with said rear trolley projecting rearwardly from the latter.

5. A conveyor as defined in claim 1, wherein said driving member has a rear face substantially parallel to said front face, and including a holding lever on each trolley means mounted for tilting movement about said pivot axis, said holding lever having a front face normally spaced from said rear face of said driving member, and biasing means cooperating with said holding lever for normally maintaining the front face thereof in the path of movement of said rear face of said driving member so that when said trolley means moves faster than said chain, said front face of said holding lever will engage said rear face of said driving member.

6. A conveyor as defined in claim 3, wherein each of said trolley means comprises a single trolley, said spur projecting rearwardly from said single trolley and being adapted to cooperate with said cam face of the following trolley.

7. A conveyor as defined in claim 6, and including a spacer plate fixed to and projecting rearwardly from said trolley to limit the approach of two adjacent trolleys to each other.

8. A conveyor as defined in claim 7, wherein said spur is mounted on said spacer plate.

* * * * *